(12) United States Patent
Pick et al.

(10) Patent No.: US 9,434,598 B2
(45) Date of Patent: Sep. 6, 2016

(54) MOBILE FUELING VEHICLE AND METHOD

(71) Applicant: Ultimate CNG, LLC, Oakton, VA (US)

(72) Inventors: Dennis A. Pick, Oakton, VA (US); Brian P. Fimian, Falls Church, VA (US)

(73) Assignee: Ultimate CNG, LLC, Oakton, VA (US)

( * ) Notice: Subject to any disclaimer, the term of this patent is extended or adjusted under 35 U.S.C. 154(b) by 443 days.

(21) Appl. No.: 13/829,674

(22) Filed: Mar. 14, 2013

(65) Prior Publication Data
US 2013/0240080 A1 Sep. 19, 2013

Related U.S. Application Data

(60) Provisional application No. 61/611,377, filed on Mar. 15, 2012.

(51) Int. Cl.
*F17C 5/06* (2006.01)
*B67D 7/04* (2010.01)
(Continued)

(52) U.S. Cl.
CPC ............ *B67D 7/04* (2013.01); *B60K 15/00* (2013.01); *F17C 5/007* (2013.01); *F17C 5/06* (2013.01); *F17C 7/00* (2013.01); *F17C 2201/0104* (2013.01); *F17C 2201/035* (2013.01); *F17C 2201/054* (2013.01); *F17C 2205/0111* (2013.01); *F17C 2205/0142* (2013.01);
(Continued)

(58) Field of Classification Search
CPC ............ F17C 2265/061; F17C 2265/065; F17C 2265/066; F17C 2270/0139; F17C 2270/0171; F17C 5/007; F17C 5/06; F17C 7/00; F17C 2201/0104; F17C 2201/054; F17C 2201/035; F17C 2225/033; F17C 2225/036; F17C 2225/0123; F17C 2225/161; F17C 2221/033; F17C 2250/01; F17C 2250/032; F17C 2250/043; F17C 2250/0439; F17C 2205/0111; F17C 2205/0142; F17C 2205/0157; F17C 2223/0123; F17C 2223/0161; F17C 2223/033; F17C 2223/036; F17C 2227/0157; F17C 2227/043; B67D 7/04; B60K 15/00
USPC .................... 141/1, 4, 94–95, 231
See application file for complete search history.

(56) References Cited

U.S. PATENT DOCUMENTS 3,905,516 A * 9/1975 Wisnia ............... F04D 15/0066
222/63
4,911,330 A * 3/1990 Vlaanderen ............ B60P 3/224
222/132
(Continued)

OTHER PUBLICATIONS

Universal Air Products brochure, www.vapc.com, undated, 1 pg.

*Primary Examiner* — Nicolas A Arnett
(74) *Attorney, Agent, or Firm* — Sterne, Kessler, Goldstein & Fox P.L.L.C.

(57) ABSTRACT

Vehicles, systems, and methods for delivering natural gas and providing mobile fueling services are disclosed. A method of delivering natural gas includes: delivering a source vehicle to a receiving tank for receiving natural gas at a remote refueling location, the source vehicle having a natural gas engine for driving the vehicle and a source tank disposed onboard the source vehicle for storing the natural gas; and transferring natural gas from the source vehicle to the receiving tank using pressure equalization between the source tank and the receiving tank and using a compressor disposed onboard the source vehicle. The onboard compressor is operatively connected to and powered by the source vehicle engine. The source tank is adapted to store a volume greater than or equal to about 200 DGE of natural gas and supplies natural gas to power the source vehicle engine.

26 Claims, 10 Drawing Sheets

(51) Int. Cl.
 B60K 15/00 (2006.01)
 F17C 5/00 (2006.01)
 F17C 7/00 (2006.01)

(52) U.S. Cl.
 CPC ... *F17C 2205/0157* (2013.01); *F17C 2221/033* (2013.01); *F17C 2223/0123* (2013.01); *F17C 2223/0161* (2013.01); *F17C 2223/033* (2013.01); *F17C 2223/036* (2013.01); *F17C 2225/0123* (2013.01); *F17C 2225/0161* (2013.01); *F17C 2225/033* (2013.01); *F17C 2225/036* (2013.01); *F17C 2227/0157* (2013.01); *F17C 2227/043* (2013.01); *F17C 2250/01* (2013.01); *F17C 2250/032* (2013.01); *F17C 2250/043* (2013.01); *F17C 2250/0439* (2013.01); *F17C 2265/065* (2013.01); *F17C 2265/066* (2013.01); *F17C 2270/0139* (2013.01); *F17C 2270/0171* (2013.01)

(56) References Cited

U.S. PATENT DOCUMENTS

| | | | | |
|---|---|---|---|---|
| 5,029,622 A | * | 7/1991 | Mutter | F17C 5/007 137/79 |
| 5,163,409 A | | 11/1992 | Gustafson et al. | |
| 5,406,988 A | * | 4/1995 | Hopkins | F17C 7/00 123/527 |
| 5,603,360 A | * | 2/1997 | Teel | F17C 5/06 137/267 |
| 5,628,349 A | * | 5/1997 | Diggins | F17C 5/06 141/3 |
| 5,632,250 A | | 5/1997 | Kato et al. | |
| 5,694,985 A | * | 12/1997 | Diggins | F17C 5/06 123/525 |
| 5,881,779 A | * | 3/1999 | Kountz | F17C 5/06 141/2 |
| 5,975,162 A | | 11/1999 | Link, Jr. | |
| 6,006,525 A | | 12/1999 | Tyree, Jr. | |
| 6,205,793 B1 | * | 3/2001 | Schimp | F17C 11/007 62/46.1 |
| 6,223,844 B1 | | 5/2001 | Greenhill et al. | |
| 6,382,264 B1 | * | 5/2002 | Tsai | H01M 6/5077 141/1 |
| 6,672,340 B2 | * | 1/2004 | Mutter | F17C 5/06 141/21 |
| 6,755,225 B1 | * | 6/2004 | Niedwiecki | B60P 3/14 141/18 |
| 7,264,025 B2 | * | 9/2007 | Farese | F17C 5/06 141/198 |
| 7,391,129 B2 | | 6/2008 | Chiao et al. | |
| 7,571,763 B2 | * | 8/2009 | Schimp | E21B 43/00 166/53 |
| 7,721,557 B1 | | 5/2010 | Stearns | |
| 7,766,578 B2 | * | 8/2010 | Schimp | E21B 43/00 405/53 |
| 2006/0156742 A1 | | 7/2006 | Farese et al. | |
| 2008/0071596 A1 | | 3/2008 | Smith | |
| 2008/0127673 A1 | | 6/2008 | Bowen et al. | |
| 2009/0236006 A1 | * | 9/2009 | Farese | F17C 5/007 141/3 |
| 2010/0050925 A1 | | 3/2010 | Donnelly et al. | |
| 2011/0114411 A1 | | 5/2011 | Merth et al. | |
| 2012/0104036 A1 | * | 5/2012 | Farese | F17C 5/007 222/1 |

* cited by examiner

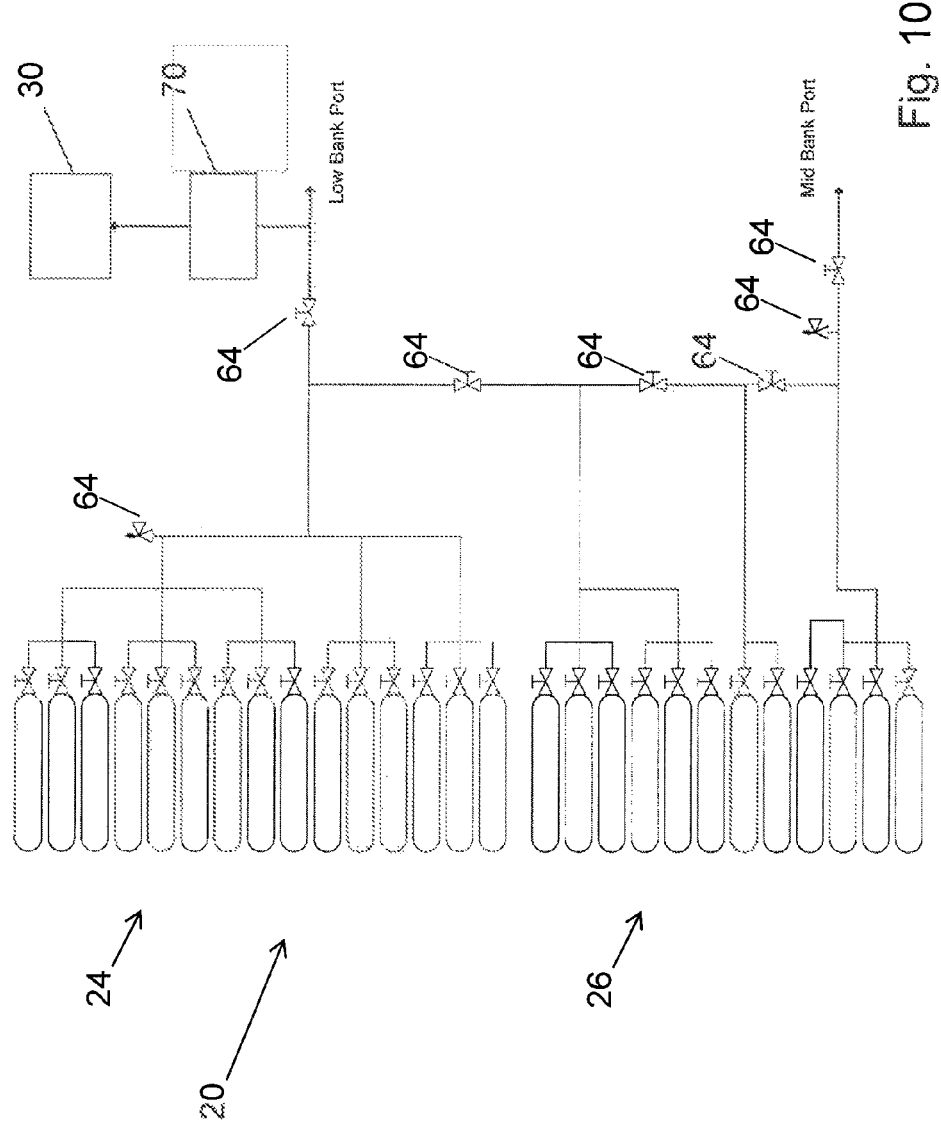

MOBILE FUELING VEHICLE AND METHOD

CROSS-REFERENCE TO RELATED APPLICATION

This application claims priority to U.S. Provisional Patent Application No. 61/611,377, filed on Mar. 15, 2012, and entitled "Mobile Fueling Vehicle and Method," the disclosure of which is incorporated herein in its entirety by reference thereto.

BACKGROUND OF THE INVENTION

1. Field of the Invention

The present invention is directed to vehicles, systems, and methods for mobile delivery of energy, and, particularly, vehicles, systems, and methods for mobile fueling of compressed natural gas.

2. Background Art

For many reasons, natural gas is rapidly becoming a popular alternative energy source. Natural gas requires little processing and its low-carbon content allows it to burn with less greenhouse gas emissions. Natural gas also has limited flammability, while gasoline and diesel can catch fire at lower temperatures and lower concentration than natural gas. Although natural gas may be compressed at high pressures for storage and distribution, these pressures meet strict governmental and industry safety standards. Moreover, given the vast quantities of untapped gas fields, natural gas represents an affordable and sustainable source of energy.

Despite these advantages, however, potential end users face significant barriers to entry for using natural gas as a convenient and affordable energy source. Although the number of fixed natural gas stations are increasing, the time and difficulty associated with accessing fuel at these stations can make natural gas use prohibitive. End users—such as, for example, private trucks and fleets, and less-than-load (LTL) carriers—can often face long refueling waits at fixed natural gas stations because of the presence of numerous other customers at popular refueling times or the slow filling rates of depleted storage tanks at the station, for example. Further, these stations are often located at inconvenient locations from the end user, requiring significant time and dollar expenditure for access. Moreover, known mobile delivery systems for other types of fuels do not have the storage and compression requirements needed for a convenient and efficient natural gas fueling system. Without affordable and efficient access to natural gas, end users may be unwilling to make necessary infrastructure investment to convert devices, vehicles, fleets, and businesses to natural gas. As a result, potential economic and environmental advantages remain unrealized. Therefore, what is needed is a natural gas fueling technology and method that allows affordable and efficient access to this source of energy.

BRIEF SUMMARY OF THE INVENTION

Embodiments of the present invention relate to a method of delivering natural gas. In an embodiment, the method includes delivering a source vehicle to a receiving tank for receiving natural gas at a remote refueling location, the source vehicle having a natural gas engine for driving the vehicle and a source tank disposed onboard the source vehicle for storing the natural gas; and transferring natural gas from the source vehicle to the receiving tank using pressure equalization between the source tank and the receiving tank and using a compressor disposed onboard the source vehicle, wherein the source tank is adapted to store greater than about 200 diesel gallon equivalent (DGE) of natural gas and supplies natural gas to power the source vehicle engine. The onboard compressor is operatively connected to and powered by the source vehicle engine.

In another embodiment, a natural gas fueling vehicle includes: a source tank disposed onboard the vehicle adapted to store natural gas to be provided to a discrete receiving tank; an engine operatively connected to the source tank for receiving natural gas to power the engine; and a first compressor operatively connected to and powered by the natural gas engine for compressing natural gas delivered from the source tank to the discrete receiving tank.

In another embodiment, a method of delivering natural gas during a delivery cycle includes: delivering a source vehicle to a plurality of natural gas receiving tanks each provided at a remote refueling location, the source vehicle having a natural gas engine, a compressor operatively connected to the natural gas engine, and a source tank disposed onboard the source vehicle for storing natural gas; determining the location of the source vehicle and the location of one or more of the receiving tanks during the delivery cycle; monitoring the volume of natural gas in each receiving tank; and delivering the source vehicle to one of the remote refueling locations based on the location of the source vehicle and the current volume of at least one receiving tank.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 10 is a schematic diagram of a mobile fuel storage and dispensing system according to an embodiment of the present invention.

DETAILED DESCRIPTION OF THE INVENTION

Figure 1:
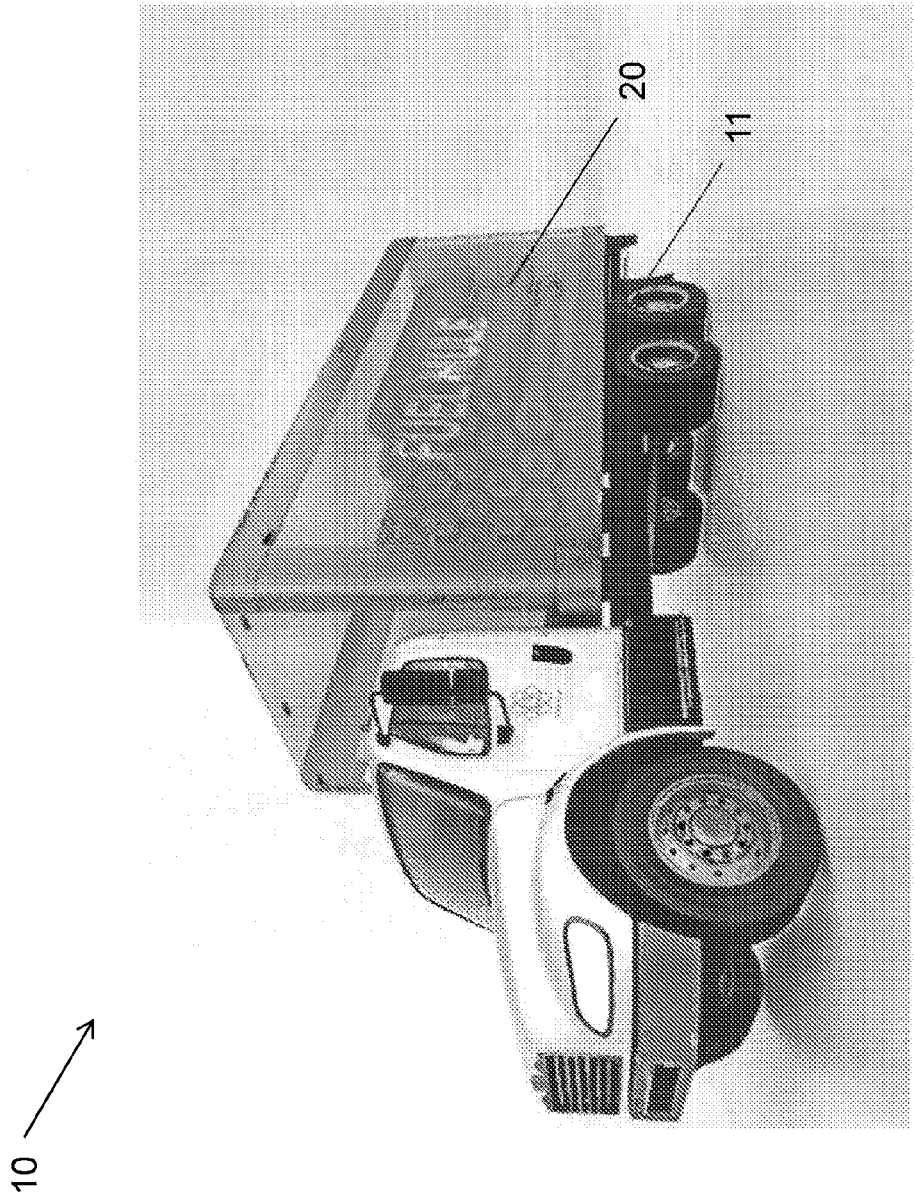
FIG. 1 is a schematic illustration of a mobile gas fueling vehicle according to an embodiment of the present invention.

The present invention will now be described in detail with reference to embodiments thereof as illustrated in the accompanying drawings, in which like reference numerals are used to indicate identical or functionally similar elements. References to "one embodiment", "an embodiment" "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention include a vehicle 10 for mobile delivery of fuel, such as, for example, compressed natural gas. Unlike permanent (i.e., fixed) natural gas stations, embodiments of the present invention are adapted to provide remote fueling to a receiving tank at a convenient customer location. In various embodiments, the vehicle 10 includes a natural gas engine adapted to drive both the vehicle and an onboard compressor using fuel received from the same onboard source from which fuel is dispensed to the customer receiving tanks. In this manner, embodiments of the present invention provide a vehicle 10 with a self-contained energy source such that no additional power source (e.g., generator, electrical AC/DC power outlet) at the receiving tank location is required. In various embodiments, the vehicle 10 is adapted for rapid loading and unloading of natural gas onto and from the vehicle 10 to enable convenient and efficient fueling. The fuel delivered by the vehicle 10 is described herein as compressed natural gas. It is contemplated, however, that aspects of embodiments of the vehicle 10 and systems and methods described herein may be used in conjunction with mobile delivery of other energy sources, including, but not limited to, liquefied natural gas, stranded gas, pressurized fuels, and other fuels.

With reference to FIG. 1, a mobile fueling vehicle 10 includes an onboard source tank 20 for storing compressed natural gas. The vehicle 10 may include a support infrastructure 11 (e.g., chassis, trailer, or flatbed) for supporting the components of the vehicle, including source tank 20. The type of vehicle shown in FIG. 1 is for illustrative purposes only. As will be appreciated, the vehicle 10 may be any suitable truck for providing one or more of the features described herein, including, but not limited to, light duty trucks, medium duty trucks, heavy duty trucks, box trucks, and other suitable trucks. Methods of embodiments of the present invention may be carried out by a single mobile fueling vehicle 10 or a fleet of mobile fueling vehicles 10.

Figure 8:
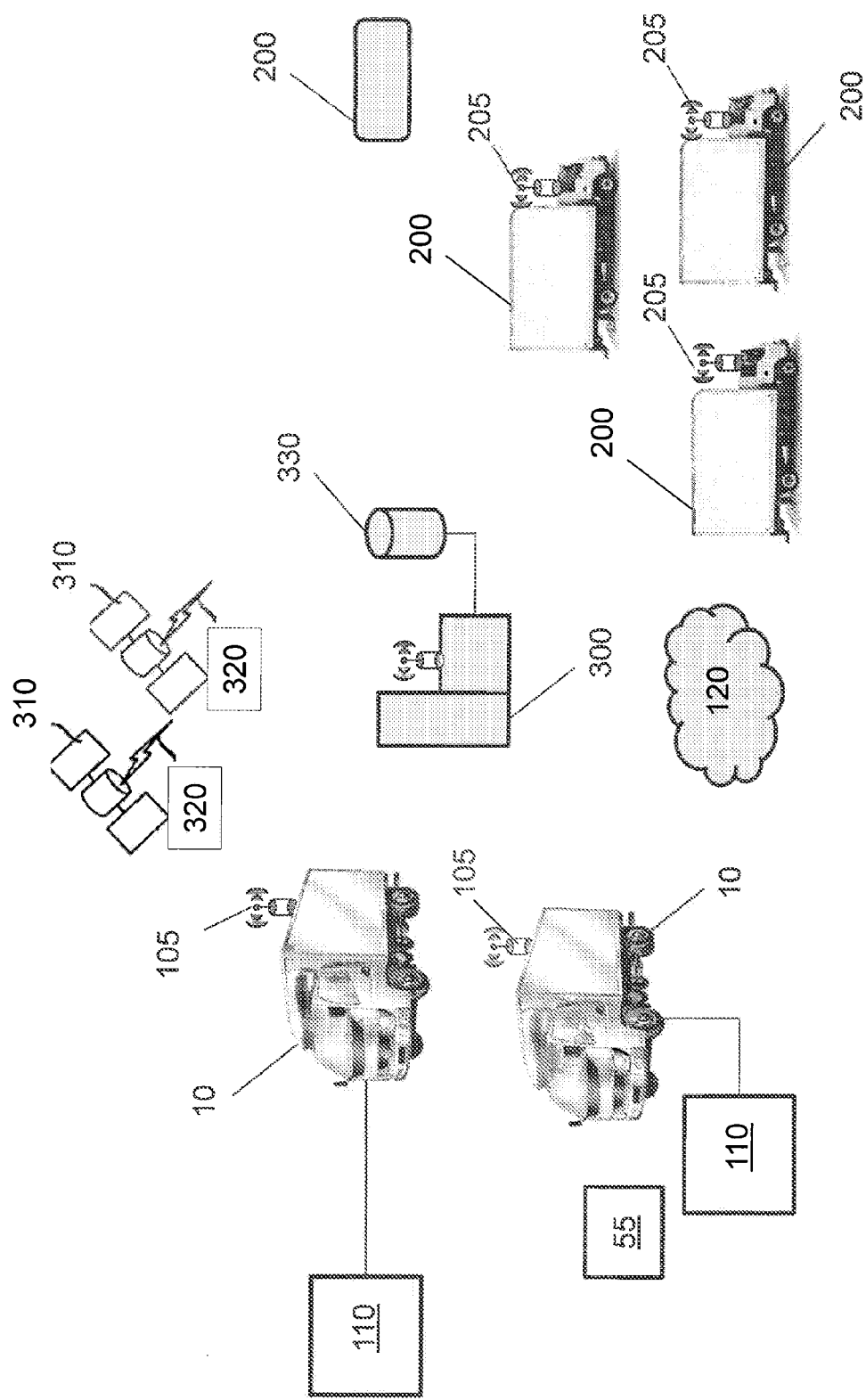
FIG. 8 is a schematic diagram of a mobile fueling vehicle monitoring system according to an embodiment of the present invention.

The vehicle 10 is adapted for mobile delivery of natural gas stored in the source tank 20 to a receiving tank 200 (as shown in FIG. 8 and discussed below) at a remote customer location. As shown for example in FIG. 2, the vehicle 10 preferably also includes a natural gas engine 30 operatively connected to the source tank 20. The engine 30 is adapted to receive fuel from the source tank 20 and drive the vehicle through a drive shaft 35 and other known drive train components. In one embodiment, the vehicle 10 further includes a compressor 50 disposed onboard the vehicle 10 and operatively connected to the engine 30. The compressor 50 is adapted to compress natural gas during uploading of natural gas to the source tank 20 and/or during dispensing of natural gas from the source tank 20 to the receiving tank 200 during a fueling event at preferred fueling pressures such that rapid fueling times may be achieved.

During a fueling event, the vehicle 10 is adapted to transfer natural gas from the source tank 20 to a receiving tank 200 initially using tank equalization between the source tank 20 and the receiving tank 200 and thereafter using the compressor 50 disposed onboard the vehicle 10 for the remaining dispensing of gas. For example, depending on the size of receiving tank 200 and the amount of gas in source tank 20 at the time of fueling, from about 30% to about 90% or more of the fill may occur through tank equalization. In one embodiment, the vehicle 10 is adapted to transfer natural gas at a rate of about 8 diesel gallon equivalent (DGE)/minute to a pressure in the receiving tank 200 of about 3600 psi. In one embodiment, the vehicle 10 is adapted to transfer natural gas at a rate of about 10 DGE/min to a pressure in the receiving tank 200 of about 3600 psi. In one embodiment, the vehicle 10 is adapted to transfer natural gas at a rate of about 12 DGE/min to a pressure in the receiving tank 200 of about 3600 psi. In one embodiment, the vehicle 10 is adapted to transfer natural gas at a rate of about 15 DGE/min to a pressure in the receiving tank 200 of about 3600 psi. As will be appreciated, the precise use of tank equalization and the compressor 50 depend on numerous factors during the fueling event, including, but not limited to, the fuel levels in both the source tank and the receiving tank, temperature, and the desired resultant fuel pressure in the receiving tank. Because of the availability of the compressor 50 onboard the vehicle 10, rapid fueling times of one or multiple receiving tanks may be achieved and one or more of the disadvantages of providing fueling at a permanent natural gas stations may be avoided.

In one embodiment, the engine 30 may be used to power other components disposed onboard the vehicle 10 such that natural gas stored in the source tank 20 is the source of power and energy for some or all components onboard. For example, components typically adapted to be powered electrically, hydraulically, or with diesel or gasoline fuel, may be adapted to be driven off the natural gas powered engine 30. In this manner, the vehicle 10 comprises a single power source vehicle and may provide significant advantages over permanent fueling stations. For example, because permanent fueling stations typically include components—such as compressors, dispensers, control systems, and lighting—that draw power from electrical power sources, these stations are susceptible to power outages. The vehicle 10 according to embodiments of the present invention includes a self-contained power source and avoids these limitations.

The source tank 20 comprises one or more storage tanks adapted to store a large volume of natural gas. Because the source tank 20 also supplies fuel to the engine 30, a larger total volume for source tank 20 may be used. In one embodiment, source tank 20 is adapted to store greater than about 200 gallons of natural gas. In one embodiment, source tank 20 is adapted to store greater than about 600 gallons of natural gas. In one embodiment, source tank 20 is adapted to store greater than about 700 gallons of natural gas. As will be appreciated, the size of the source tank 20 may be characterized in a manner other than volume (gallons).

Characterized in diesel gallon equivalent (DGE), in one embodiment, source tank 20 is adapted to store greater than about 200 DGE of natural gas. In one embodiment, source tank 20 is adapted to store greater than about 600 DGE of natural gas. In one embodiment, source tank 20 is adapted to store greater than about 700 DGE of natural gas. In one embodiment, source tank 20 is adapted to store in the range of from about 200 DGE to about 1500 DGE of natural gas. Characterized in energy units, in one embodiment, source tank 20 is adapted to store greater than about 27 M BTUs of natural gas. In one embodiment, source tank 20 is adapted to store greater than about 83 M BTUs of natural gas. In one embodiment, source tank 20 is adapted to store greater than about 97 M BTUs of natural gas. In one embodiment, source tank 20 is adapted to store in the range of from about 27 M BTUs to about 207 M BTUs of natural gas.

In one embodiment, the source tank 20 comprises a plurality of smaller tanks adapted to store natural gas at desired pressures which in total provide the desired storage capacity of the source tank. The source tank 20 preferably comprise composite material (e.g., Type 3 or Type 4 composite tanks) such that the tanks are light and durable. In one embodiment, source tank 20 may comprise twenty-seven (27) storage tanks each of approximately 25.7 diesel gallon equivalents in size. For example, in one embodiment, source tank 20 may comprise twenty-seven (27) NGV2 320 water liter tanks provided by Dynetek Industries Ltd. of Calgary, CANADA. It will be appreciated that other suitable storage tanks for source tank 20 may be used to provide the unique storage and rapid loading and dispensing capabilities of embodiments of the present invention. In one embodiment, as discussed in more detail below, source tank 20 may be segregated into a plurality of storage banks in order to effectively manage dispensing of the fuel stored therein for rapid fueling at the remote customer location. In one embodiment, as shown, for example, in FIGS. 4 and 5, a tank support enclosure 22 may be disposed about the source tank 20 to support the source tank 20 and/or to meet necessary safety requirements (e.g., United States Department of Transportation regulations).

Figure 2:
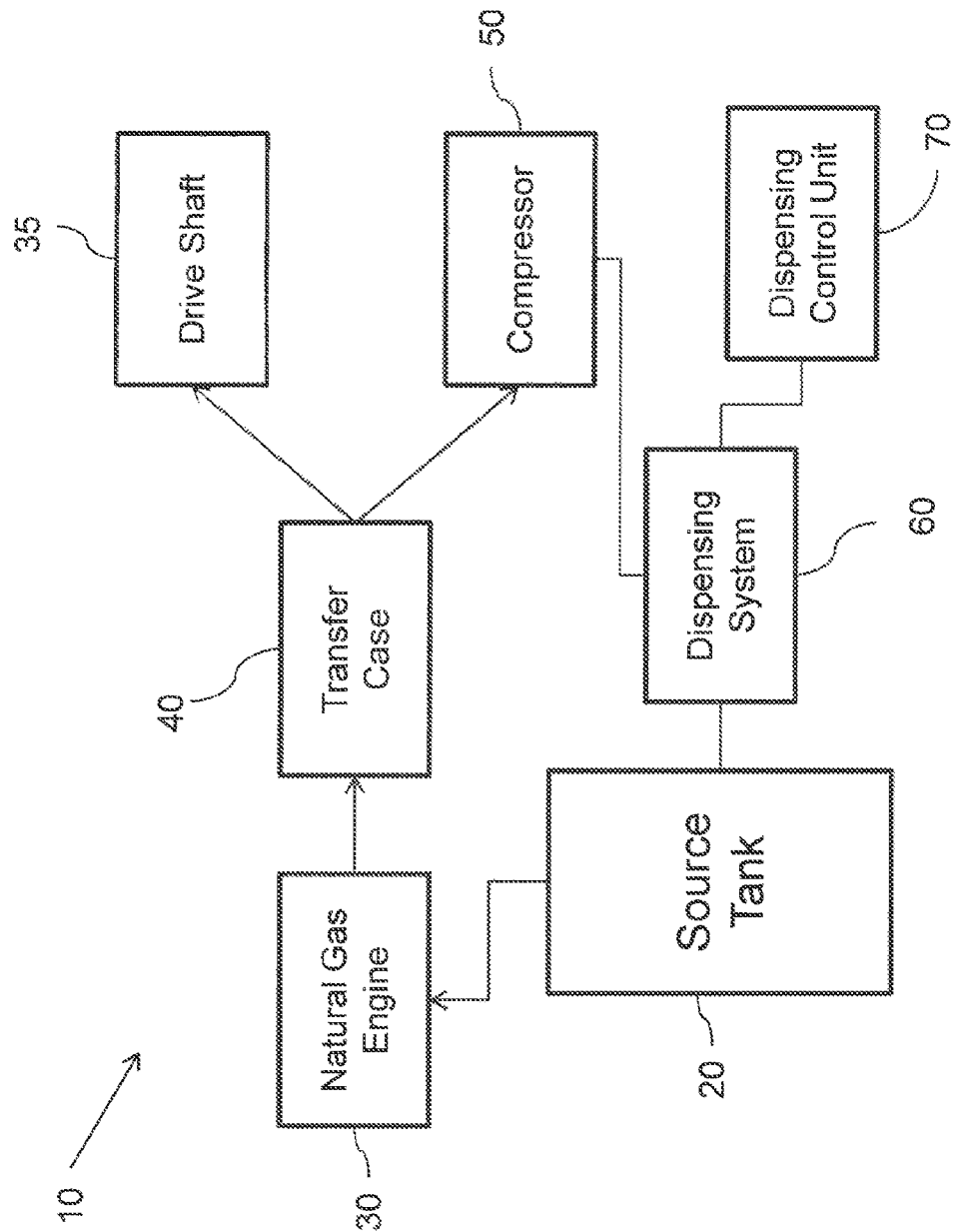
FIG. 2 is a block diagram of components of a mobile natural gas fueling vehicle according to an embodiment of the present invention.
Figure 4:
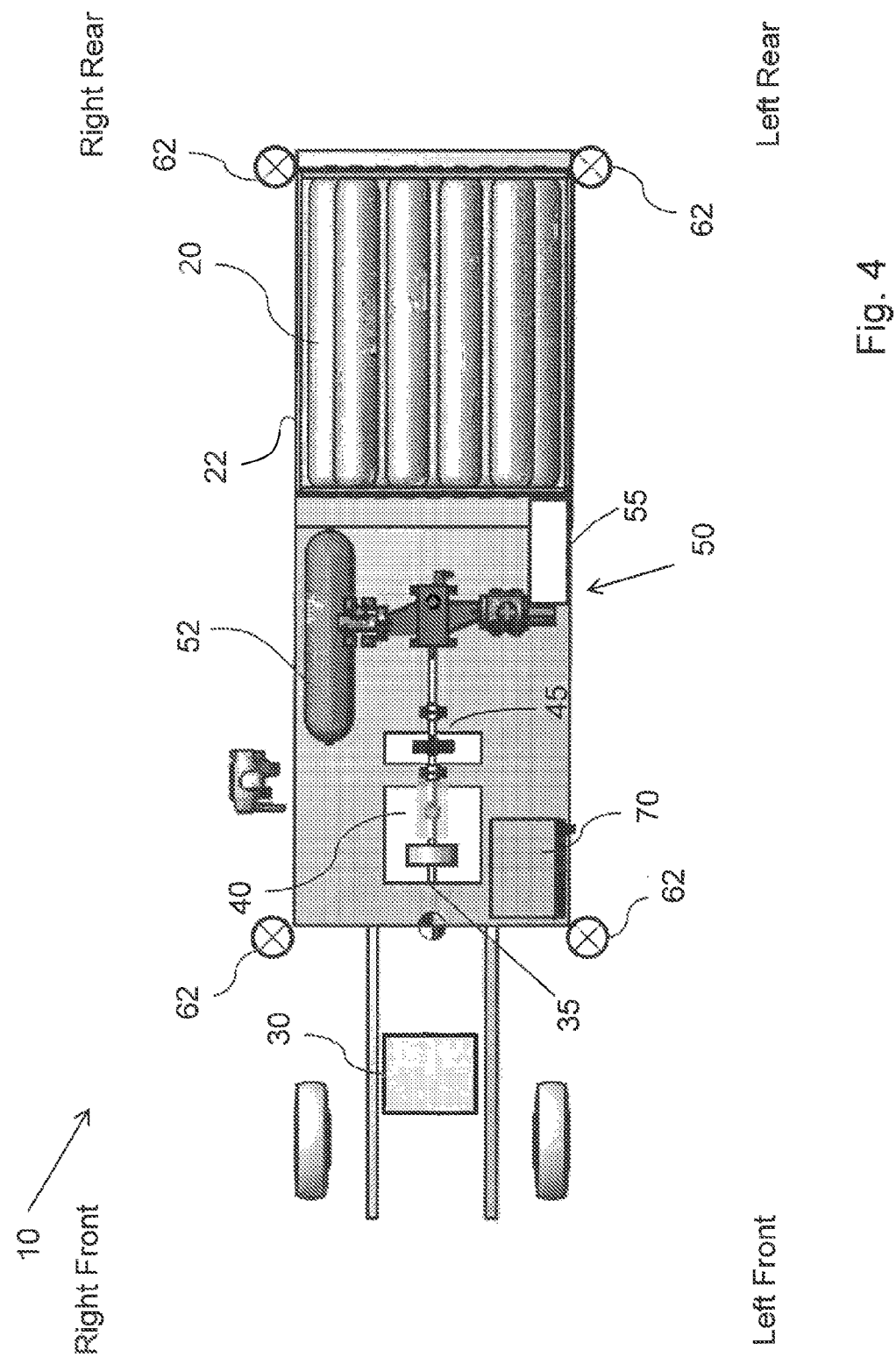
FIG. 4 is a partial schematic plan view of a mobile fueling vehicle according to an embodiment of the present invention.
Figure 5:
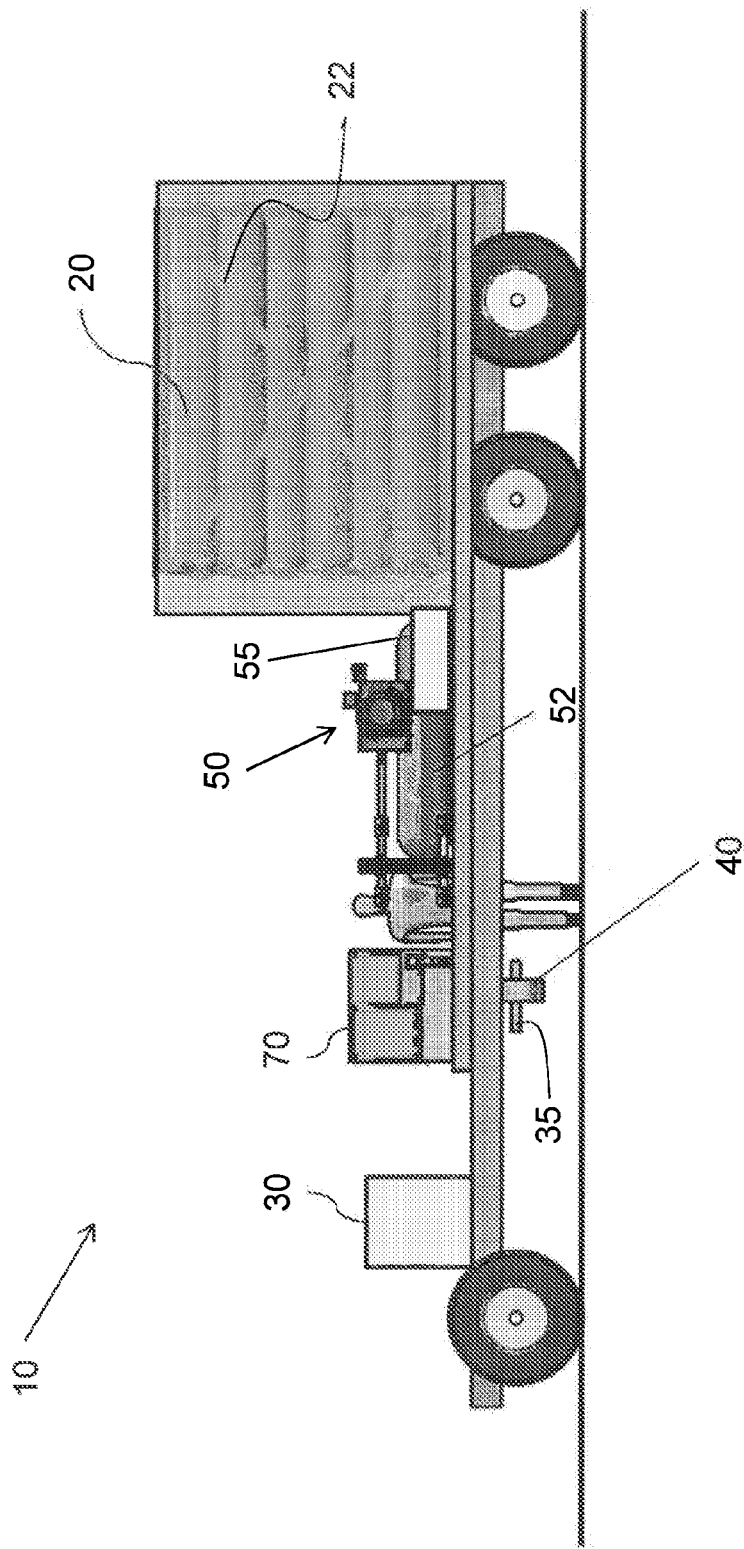
FIG. 5 is a partial side view of the mobile fueling vehicle of FIG. 4 according to an embodiment of the present invention.

With reference to FIGS. 2 and 4-5, in one embodiment the vehicle 10 further includes a transfer case 40 operatively disposed between the engine 30 and the compressor 50 for selectively providing power from the engine 30 (e.g., through the transmission) to the compressor 50 or the drive shaft 35 of the vehicle. For example, during driving operation of the vehicle the transfer case 40 is locked into operative connection with the drive shaft 35 and the vehicle proceeds to the remote customer fueling location, under normal power. As will be appreciated by those of skill in the art, the mode of operation may be selected by the operator via a shift or shaft located, for example, in the cab of the vehicle or on the outside of the vehicle. Before a fueling event, the vehicle operator may place the vehicle transmission into park and operate a fueling switch which locks the transfer case 40 into operative connection with the compressor 50 and may activate the vehicle parking break. In one embodiment, after increasing the RPMs of the engine 30 to the rated level for the compressor 50 (e.g., 1800 RPM), proper uploading of fuel from a natural gas source to the source tank 20 or dispensing of fuel from the source tank 20 to the receiving tank 200 may occur. In one embodiment, as shown in FIG. 4, the transfer case 40 is operatively connected to the compressor 50 through a belt pulley system 45 which selectively transfers power from the engine to the desired component. In other embodiments, other suitable power transfer systems, such as a gear train, may be included. In one embodiment, the transfer case 40 is provided specifically to the exclusion of a rear engine power take off system so as to maximize horsepower delivered from the engine 30 and thereby reduce parasitic loads and/or enable additional horsepower, which in some embodiments may allow for use of a larger compressor 50.

Figure 3:
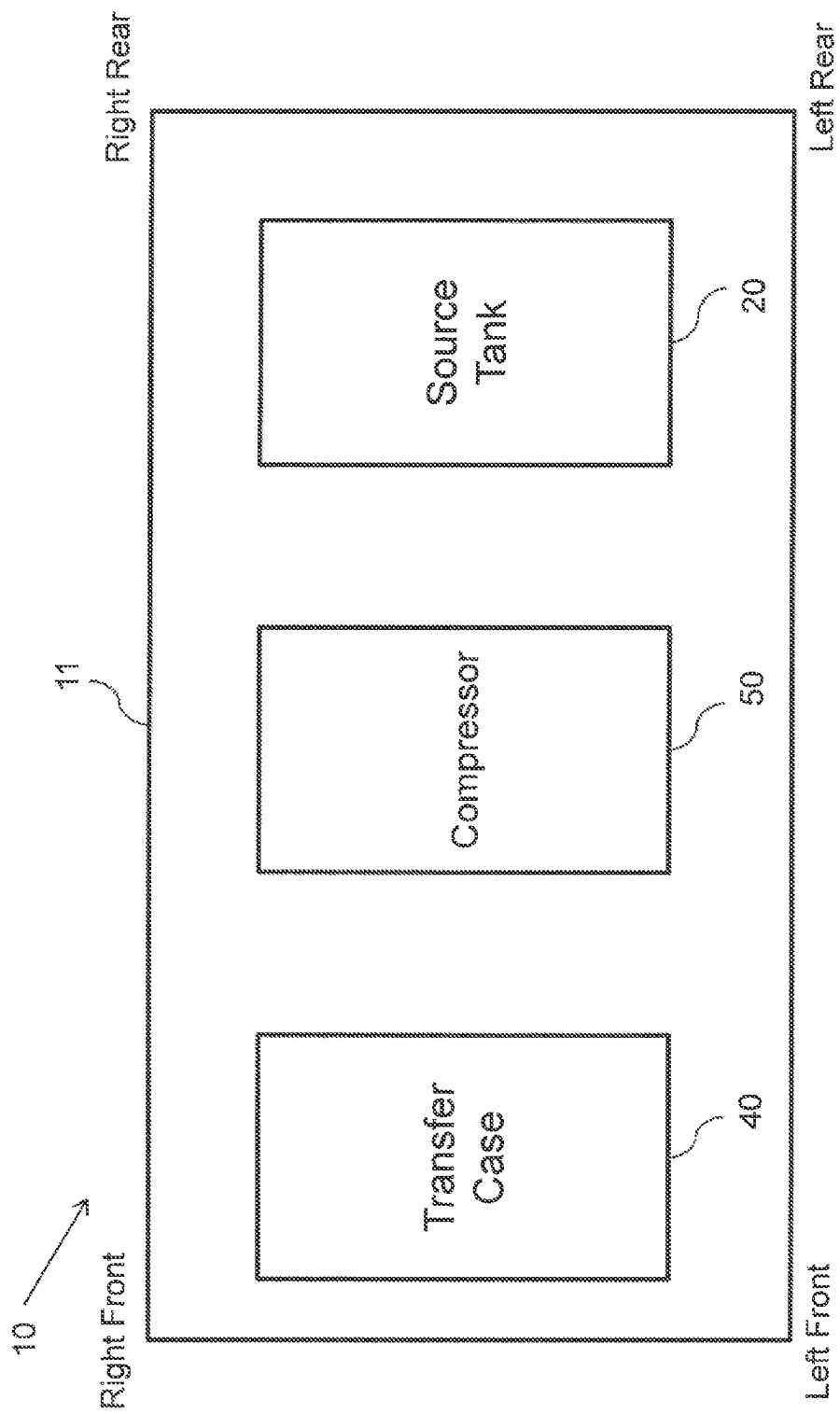
FIG. 3 is a block diagram of a component arrangement of a mobile natural gas fueling vehicle according to an embodiment of the present invention.
Figure 6:
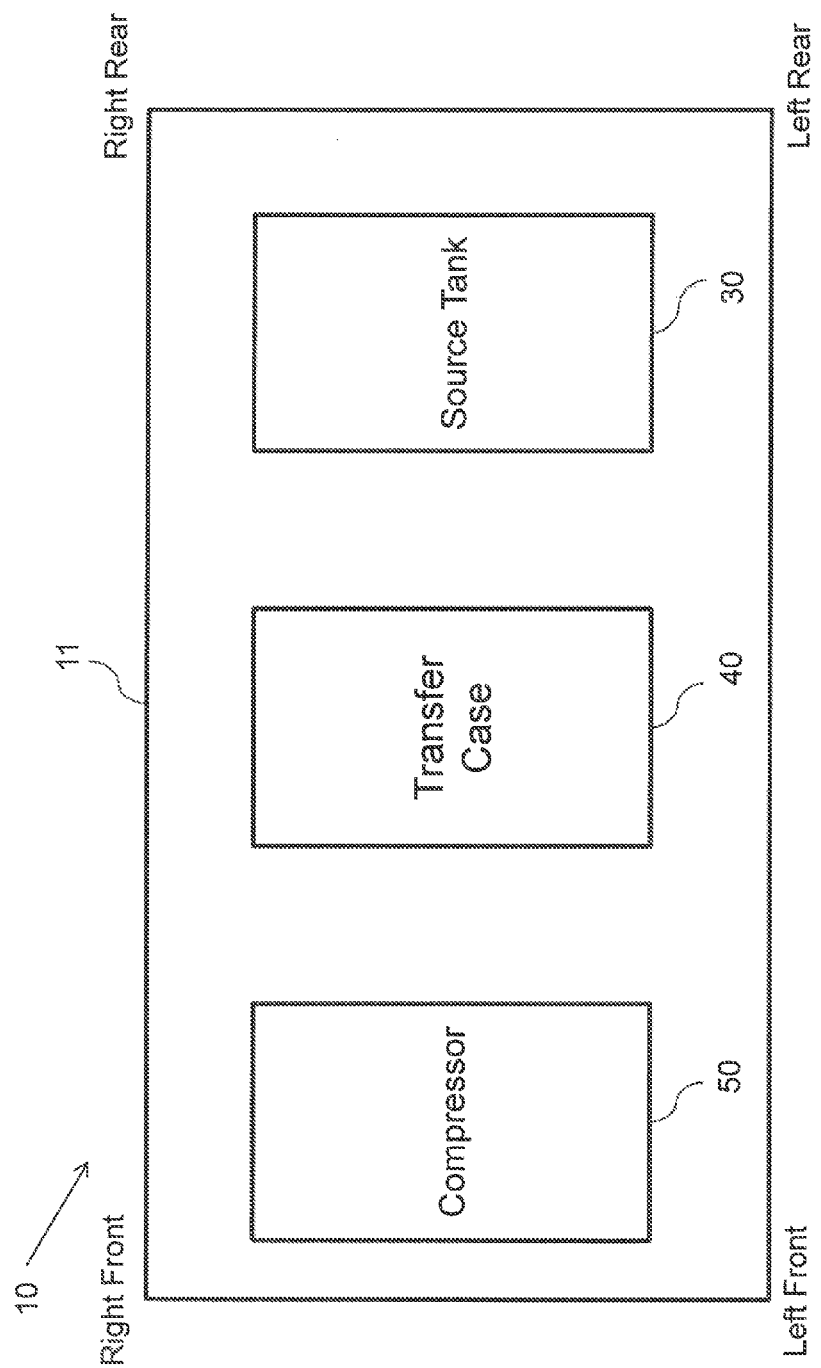
FIG. 6 is a block diagram of a component arrangement of a mobile natural gas fueling vehicle according to another embodiment of the present invention.

In one embodiment, the relative location of the source tank 20, the compressor 50 and the transfer case 40 may be critical to optimal operation of the vehicle 10 during a fueling event. In one embodiment, as shown, for example, in FIGS. 3-5, the source tank 20 is disposed onboard the rear portion of the vehicle 10 and the transfer case 40 is disposed onboard the forward portion of the vehicle such that the compressor 50 is disposed intermediate to the transfer case 40 and the source tank 20 onboard the vehicle support 11. The transfer case 40 may be disposed at a position forward of a rear axle of the vehicle 10. In one embodiment, for example, the transfer case 40 may be disposed at a position at least three feet forward of the rear axle of the vehicle 10. In another embodiment, as shown, for example, in FIG. 6, the source tank 20 is disposed onboard the rear portion of the vehicle 10 and the compressor 50 is disposed onboard the forward portion of the vehicle 10 such that the transfer case 40 is disposed intermediate to the source tank 20 and the compressor 50.

In one embodiment, as shown in FIGS. 4 and 5, for example, the compressor 50 is operatively connected to a blow down tank 52 for releasing pressure from the compressor 50 after use. For example, during fueling high pressure may build up in compressor 50. After the vehicle 10 has been returned to drive operation, the pressure may be released to blow down tank 52 to limit wear on the compressor and ensure proper operation. As will be apparent, the vehicle 10 may further include a cooling mechanism for cooling the compressor 50 and/or gas running through the compressor during or after operation. For example, a cooling mechanism may cool compressed gas as it exits vehicle 10 and enters receiving tank 200 so as to compensate for heat of compression in the receiving tank. This may provide a fuller fill in receiving tank 200 (i.e., more moles of gas in the tank at or near maximum tank operating pressure), particularly on very hot days and in very hot climates.

In one embodiment, as shown in FIG. 2, the vehicle 10 further includes a dispensing system 60 for dispensing the natural gas from the source tank 20 to the receiving tank 200. The dispensing system 60 is operatively connected to the source tank 20 and is adapted to dispense desired quantities of fuel at desired pressures to the receiving tank 200 through a plurality of outputs 62. Outputs 62 may comprise high pressure hose and nozzle assemblies adapted for communicating with the receiving tank 200 during a fueling event. For example, in one embodiment each output 62 may include about 20 to about 25 feet of ¾ inch hose rated for approximately 3,600 psi. As shown, for example, in FIGS. 4, 6, and 9, in one embodiment the vehicle 10 includes outputs 62 at the right and left front (RF and LF) portions of the vehicle 10 and the right and left rear (RR and LR) portions of the vehicle 10. Other arrangements of the outputs 62 may be used, including, but not limited to, a single output 62 centrally located on each side of the vehicle 10. As will be appreciated, dispensing system 60 further includes suitable infrastructure (e.g., pipes or tubing) for delivering the fuel from the source tank 20 to the outputs 62.

Figure 7:
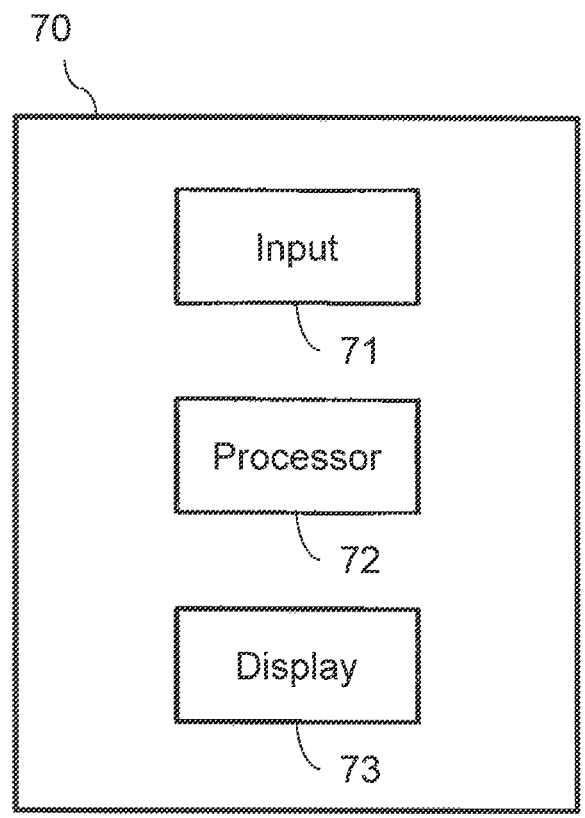
FIG. 7 is a block diagram of a dispensing control unit of a mobile natural gas fueling vehicle according to an embodiment of the present invention.

In one embodiment, as shown, for example, in FIG. 2, the vehicle 10 includes a dispensing control unit 70 operatively connected to the dispensing system 60 for controlling the dispensing of fuel to the customer receiving tank 200. With reference to FIG. 7, the dispensing control unit 70 includes an operator input 71, a processor 72, and a display 73. Processor 72 is generally a unit that processes or controls computer readable media steps, algorithms, and commands associated with operation of the dispensing system 60 such that receiving tank 200 is efficiently fueled from the source tank 20 and/or natural gas is efficiently uploaded to source tank 20 from a natural gas source. In one embodiment, the processor 72 may include a dispensing algorithm for optimal operation of the outputs 62 (e.g., right front, left front, rear right, rear left), dispensing valves, and source tank banks of the vehicle. The processor 72 may also store data related to a fueling event and receiving tank 200, such as, for example, the time, date, vehicle identification, and dispensed quantity of natural gas. In one embodiment, processor 72 may include algorithms and data related to the vehicle location and tank level monitoring system, as discussed below.

The dispensing control unit 7Q may further include an operator input 71 for receiving input from the operator. The operator input 71 may include a touch-screen, alphanumeric keypad, mouse, and/or other suitable input peripherals. The display 73 may include audible or visual display capability for displaying fueling information to the vehicle operator. As will be appreciated by those of ordinary skill in the art, the dispensing control unit 70 components are operably connected to provide the functions and interactions necessary to provide the methods described herein. In one embodiment, all or a portion of the dispensing control unit may be disposed within an operator cab of the vehicle 10 or along an outer portion of the vehicle.

With reference to FIG. 8, embodiments of the present invention provide a method of delivering natural gas using one or more mobile fueling vehicles 10 to one or more receiving tanks 200 at a remote customer fueling location. In one embodiment, the receiving tank 200 may be part of a customer vehicle. The customer vehicle may be, for example, a private truck, a utility truck, a less-than-load (LTL) carrier, or any other vehicle requiring natural gas for operation. In one embodiment, the customer receiving tank 200 may include a fleet of vehicles at the customer's fleet yard. Because the mobile fueling vehicles 10 are adapted to deliver fuel to the customer location, rather than requiring the customer to travel to a fueling location, the systems and methods of the present invention provide advantages over fixed permanent natural gas fueling stations. In some embodiments, one or more receiving tanks 200 may comprise fixed storage tanks at the customer site.

Embodiments of the present invention may include a location and fuel level monitoring system so as to provide efficient delivery of natural gas. With reference to FIG. 8, in one embodiment one or more mobile fueling vehicles 10 may be global positioning system (GPS) equipped vehicles. The system may include GPS satellites 310 that continuously emit GPS signals 320 which may allow a mobile fueling fleet operator 300 to continuously determine the position of each vehicle 10. As will be appreciated, each vehicle 10 includes the necessary GPS receiver/transmitter 105 to receive and transmit location data. The vehicle 10 may further include a fuel level sensor operatively connected to the source tank 20 for determining the level of fuel in the tank. The fuel level in vehicle 10 is useful for determining the amount of fuel available for delivery to receiving tanks 200. Because the source tank 20 also provides natural gas to engine 30, the fuel level also is useful for determining the travel mileage available for vehicle 10. Vehicle location, fuel and other data may be communicated from each vehicle 10 to a fleet operations server 330 via a communication network 120, such as, for example, the internet, a Bluetooth network, GSM, WLAN, WAN, or other suitable communication network. In an alternate embodiment, the network may be a private network or intranet. One or more vehicles 10 may be adapted to receive real-time traffic alerts over the network 120 to assist in efficiently guiding the vehicle 10 to the receiving tank 200 for the next fueling event.

In one embodiment, as shown in FIG. 8; one or more receiving tanks 200 (which may be part of customer vehicles) may also include GPS receiver/transmitters 205 to continuously determine the position of each receiving tank 200. The receiving tank 200 may further include a fuel level sensor for determining the level of fuel in the tank. Receiving tank (i.e., customer vehicle) location, fuel and other data also may be communicated to the fleet operations server 330 via the communication network 120. The predetermined location of fixed receiving tanks 200 may also be stored on the fleet operations server 330.

In one embodiment, a delivery algorithm for determining the real time scheduling of fueling events may be stored on the operations server 330 and/or the vehicle processor 72. The delivery algorithm may take into account one or more factors in determining the timing and sequence of fueling events, including, but not limited to, the location of one or more mobile fueling vehicles 10, the location of one or more receiving tanks 200, the fuel level in the source tank 20 and/or the receiving tank 200, known traffic patterns, customer payment history, customer preference hierarchy, and/or other factors. In this manner a mobile fueling fleet operator can track the location of the fleet at all times and can assess and process customer fueling needs. For example, the delivery algorithm may prevent wasted resources that may occur when a vehicle 10 is sent to a remote fueling location where some or all of the customers fleet are unavailable for fueling. The delivery algorithm may be adapted to schedule a fueling event at each customer site for a particular date and time, in some embodiments, a customer may be penalized with a surcharge if one or more receiving tanks are not present at the scheduled fueling event.

The vehicle 10 is adapted to rapidly fill the source tank 20 with the desired quantity and pressure of natural gas in order to efficiently provide mobile fueling services. The vehicle 10 may be adapted to receive fuel for uploading and storing in the source tank 20 directly from a source 110, as shown, thr example, in FIG. 8. The source 110 may comprise any source of natural gas, including, but not limited to, an above-ground natural gas storage tank, a subterranean storage tank, a natural gas utility line, a subterranean Cylinder adapted for storing pressurized natural gas (as disclosed, for example, in U.S. Pat. No. 7,571,763, the disclosure of which is incorporated herein in its entirety by reference thereto), or any other source of natural gas. In one embodiment, the source 110 may comprise natural gas at sufficiently high pressure such that the gas is already at the desired uploading pressure. For example, vehicle 10 may operatively connect to a natural gas utility line which provides appropriately treated gas at medium pressure (e.g., 100 psi). Through equalization between the source tank 20 and the source 110, all or a portion of the natural gas for uploading may be completed. In embodiments where the onboard compressor 50 is rated for gas at this pressure and additional filling is required, the compressor 50 may be used to upload the remaining portion of natural gas into source tank 20. In one embodiment, the vehicle 10 may include other components, such as, for example, a desiccant dryer for removing moisture in the natural gas before uploading to the source tank 20.

In some embodiments of operation, natural gas at the appropriate uploading pressure may not be available at the source 110. For example, the source 110 may only have low pressure (e.g., 15 psi) natural gas available and the vehicle may require gas at 100 psi for uploading. In order to efficiently use such sources, vehicle 10 may further include a secondary compressor 55 to compress the natural gas to the appropriate pressure (e.g., 100 psi) before uploading the gas to the source tank 20 using the onboard compressor 50. The secondary compressor 55 may be disposed at a fixed location proximate to the source 110 (as Shown, for example, in FIG. 8), onboard the vehicle 10 (as shown, for example, in FIGS. 4 and 5) or in tow, or in another accessible configuration in order to efficiently and rapidly fill the source tank 20. As will be appreciated, the volume levels and pressures of gas provided by the source 110 may vary and any desired levels and pressures are within the scope of embodiments of the present invention.

In one embodiment, vehicle 10 may be adapted to upload natural gas from a source 110 that comprises a pre-filled storage tank at the desired uploading pressure such that less additional compression is required to fill the source tank 20 onboard the vehicle 10. For example, in one embodiment source 110 may comprise a large tank disposed at a fixed location and adapted to store one thousand (1000) diesel gallon equivalent at high pressure (e.g., 3250 psi). The source 110 may be filled with natural gas directly from another source with the use of compressor 50 and/or secondary compressor 55, as necessary. Importantly, the filling of the source 110 may occur during convenient times based on the location and/or delivery schedule of the vehicle 10. In this manner, when the vehicle 10 arrives at the source 110, the vehicle 10 may rapidly upload natural gas from the source 110. In one embodiment, the source 110 may include a fuel level and pressure sensor and may communicate the data to the operations server 330 over the network 120. In one embodiment, the delivery algorithm may include scheduling of natural gas uploading from the source 110 and may take into account the location and current fuel status of the source 110.

Figure 9:
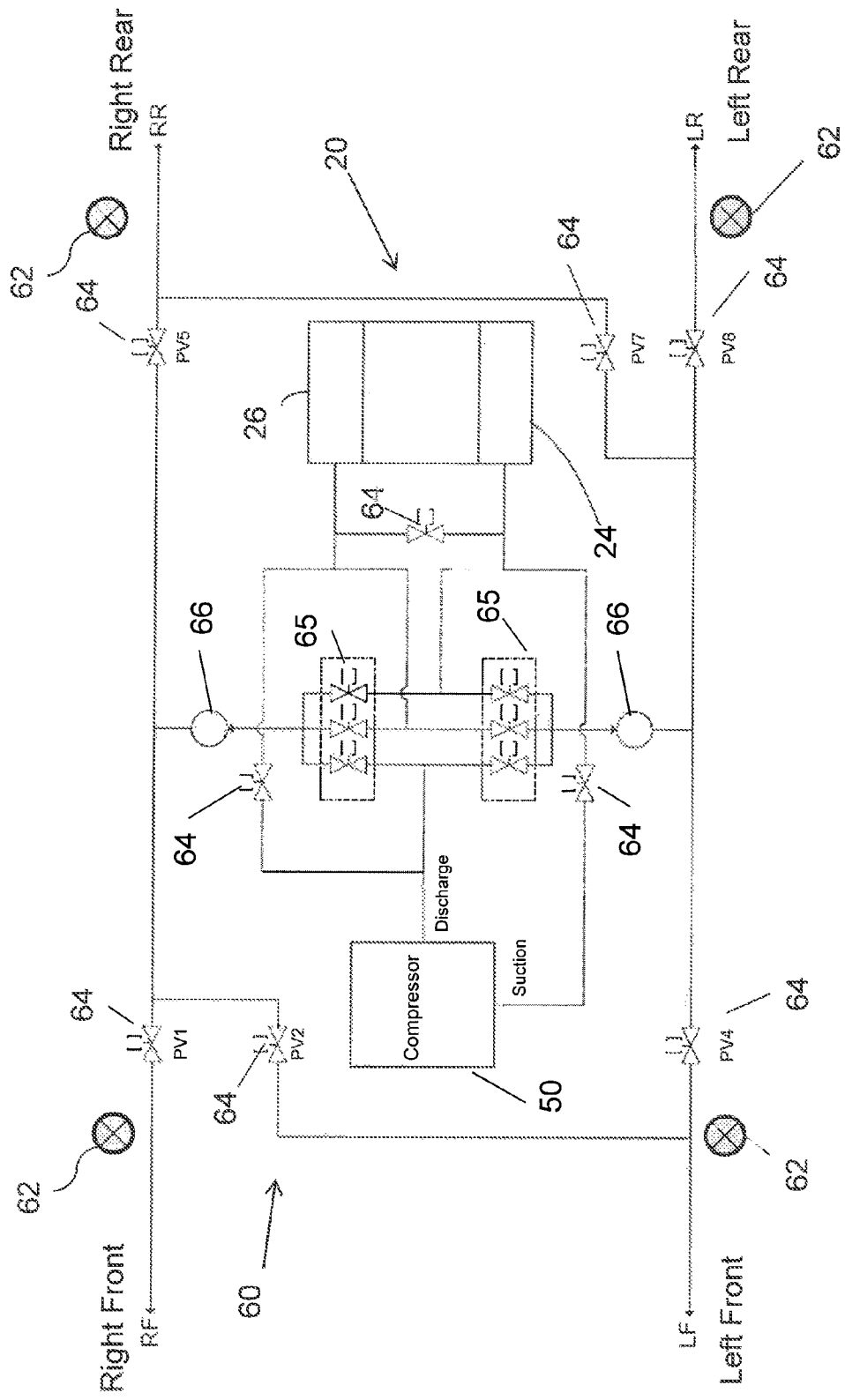
FIG. 9 is a schematic diagram of a mobile fuel dispensing system according to an embodiment of the present invention.

A storage tank 20 and dispensing system 60 according to an embodiment of the present invention will now be described with reference to FIGS. 9 and 10. The dispensing system 60 includes a plurality of dispensing valves 64, metering stations 65, and dispensing meters 66 arranged to optimally dispense natural gas through the outputs 62 to one or more receiving tanks 200. The dispensing algorithm stored on the processor 72 may control the dispensing valves 64 to efficiently dispense natural gas to the one or more receiving tanks 200. In one embodiment, the dispensing algorithm may operate the dispensing valves 64 based on the desired output location according to the following operation:

TABLE 1

Illustrative valve operation

| Output Location | Valve Position |
| --- | --- |
| Right | PV1 and PV7 open |
| Left | PV2 and PV8 open |
| Front | PV1 and PV4 open |
| Rear | PV5 and PV8 open |

The vehicle 10 is adapted to simultaneously fuel multiple receiving tanks 200. For example, in the above illustration, if the vehicle 10 is required to simultaneously fuel a receiving tank 200 at the right front (RF) of the vehicle and a receiving tank 200 at the left front (LF) of the vehicle, the dispensing algorithm may selectively open dispensing valve PV1 to fuel the receiving tank 200 at RF though a metering station 65 disposed on the right side of the vehicle, and selectively open dispensing valves PV4 to fuel the receiving tank 200 at LF through a metering station 65 disposed on the left side of the vehicle. As will be appreciated, the number and placement of the valves in dispensing system 60 may vary depending on dispensing needs and other arrangements are considered to be within the scope of the present invention.

With reference to FIG. 10, in one embodiment the source tank 20 may be segregated into a plurality of storage banks in order to effectively manage dispensing of the fuel stored therein for rapid fueling of one or more receiving tanks 200 at the remote customer location. In one embodiment, the source tank 20 may comprise a low bank 24 and a mid bank 26. In one embodiment, the low bank 24 comprises fifteen (15) individual operatively connected storage tanks and the mid bank 26 comprises twelve (12) individual operatively connected storage tanks. Other suitable numbers and arrangements of tanks within source tank 20 banks may be used. The dispensing algorithm stored on the processor 72 may control the dispensing valves 64 to dispense natural gas to the receiving tank 200 from particular storage banks to optimize the fueling. For example, during a fueling event the dispensing algorithm may initially fill the receiving tank 200 from the low bank 24. Because the pressure in the low bank is relatively high initially, a large portion or all of this initial fueling may occur using tank equalization between the low bank 24 and the receiving tank 200. When the pressure in the low bank 24 no longer allows efficient tank equalization, the dispensing algorithm may manipulate dispensing valves 64 such that fueling is then provided from mid bank 26. At this point, the pressure in mid bank 26 is at a higher pressure than low bank 24, and the fueling may then continue using tank equalization between the mid hank 26 and the receiving tank 200. In this manner, the dispensing algorithm is adapted to maximize tank equalization during fueling, resulting in a more rapid and efficient fueling event. When the pressure in the mid bank 26 no longer allows efficient tank equalization to fill the receiving tank 200 to the desired level, the dispensing algorithm may operate onboard compressor 50 to provide compressed fueling to the receiving tank 200 for the remaining fuel to reach the desired level. As will be appreciated, the dispensing algorithm may be adapted for simultaneous fueling of multiple receiving tanks 200 so as to maximize efficiency using tank equalization in combination with compression provided by onboard compressor 50 as necessary.

Embodiments of the present invention may be used in conjunction with numerous other mobile fueling applications. In one embodiment, one or more mobile fueling vehicles 10 may be provided to an area experiencing a natural gas outage. For example, gas utilities may shut off natural gas supply to a neighborhood when replacing or repairing equipment in the area. The utility may deploy one or more mobile fueling vehicles 10 to the area to provide natural gas to consumer homes or appliances in the area. In one embodiment, one or more mobile fueling vehicles 10 may be deployed to areas permanently without natural gas to provide a semi-permanent natural gas source to the area.

In one embodiment, one or more mobile fueling vehicles 10 may be provided to a permanent fueling station experiencing a natural gas outage or shortage. For example, a permanent station may be under construction, under repair, or otherwise unable to fulfill fueling needs. One or more mobile fueling vehicles 10 may be deployed to the permanent station to provide a natural gas source to fill receiving tanks 200 (e.g., vehicles). Additionally, the vehicle 10 may provide compression, storage, fuel dispensing, or other services even where a natural gas source remains available at the permanent station but when another component of the station is limiting fulfillment of fueling needs. For example, the compressor 50 may be used in lieu of a failed primary compressor or insufficient backup compressor at the permanent station.

In one embodiment, the vehicle 10 may further include one or more independent suspension systems to minimize vibration of vehicle components. As will be appreciated by those of skill in the art, other known components for operating a vehicle are considered to be well within the scope and spirit of the present invention. In one embodiment, the receiving tank 200 may include an authentication system such that the dispensing control unit 70 is adapted to confirm that the vehicle 10 is authorized to commence fueling. For example, in one embodiment, a nozzle of the dispensing output 62 may include a transceiver that communicates with a transceiver disposed on the receiving tank 200 such that fueling information (e.g., vehicle identification) is confirmed and fueling is authorized to commence.

As discussed above, source tank 20 may be segregated into a plurality of storage banks, including, for example, low bank 24 and mid bank 26, in order to effectively manage dispensing of the fuel stored therein for rapid fueling at the remote customer location. In one embodiment, because the compressor 50 is onboard vehicle 10 with source tank 20 and is operatively connected to both the low bank 24 and the mid bank 26, the compressor 50 may be adapted to compress and transfer gas within source tank 20 from the low bank 24 to the mid bank 26 at desired times. For example, in some embodiments after a first fueling event mid bank 26 may be closer to full pressure than low bank 24 and compressing and transferring gas remaining in low bank 24 to mid bank 26 may thereby facilitate rapid fueling from mid bank 26 during a second fueling event. The resulting higher pressure in mid bank 26 also may result in a more complete fill of the receiving tank 200. As discussed, the size and arrangement of mid bank 26 may vary (e.g., mid bank 26 may be further segregated into several sub-banks) to efficiently utilize tank equalization between source tank 20 and receiving tank 200.

In one embodiment, selective transfer of gas within source tank 20 (e.g., from low bank 24 to mid bank 26) may facilitate more efficient use of the compressor 50. Operation of the compressor 50 requires power from engine 30 and may require more power to start the compressor 50 from a "powered-off" condition as opposed when the compressor 50 is already in operation. In addition, more continuous operation of the compressor 50, rather than repeated cycling of operation, may extend the life of the compressor. Accordingly, in some embodiments it may be more efficient to optimize operation of the compressor 50 after it has been started. For example, vehicle 10 may be adapted to keep compressor 50 running in between fueling events. In one embodiment, vehicle 10 may be adapted to keep compressor 50 running until mid bank 26 is full and/or until the next receiving tank 200 (e.g., a vehicle) is available and hooked up for fueling. For example, the compressor 50 may be in operation until each individual tank of mid bank 26 is at 3600 psi.

In one embodiment, selective transfer of gas within source tank 20 (e.g., from low bank 24 to mid bank 26) also may be used to manage operation of the compressor 50 near noise sensitive delivery areas. For example, fueling fleet operator 300 may identify that the receiving tank 200 for receiving the next fuel delivery event may be located within a noise sensitive area such as a downtown area, a residential area, or other area that may be sensitive to the noise created by operation of a compressor. The location of the vehicle 10 with respect to the sensitive area may be determined with the UPS receiver/transmitter 105. Prior to entry into the sensitive area, a delivery or sequencing algorithm stored on the operations server 330 and/or the vehicle processor 72 may be adapted to operate the compressor 50 to compress and transfer gas in source tank 20 from low bank 24 to mid bank 26. After the vehicle 10 has entered the noise sensitive area, the vehicle 10 may download gas from the source tank 20, and mid bank 26, in particular, to fill the receiving tank 200. Because the mid bank 26 has been "primed" to a higher pressure (e.g., 3600 psi) prior to entry into the sensitive area, a more rapid delivery of fuel to the receiving tank 200 may occur without disruptive operation of the compressor 50 within the sensitive area. The higher pressure in mid bank 26 also May result in a more complete fill of the receiving tank 200.

In some embodiments, a delivery or sequencing algorithm stored on the operations server 330 and/or the vehicle processor 72 may be adapted to selectively operate the vehicle 10 (e.g., compressor 50) during uploading of fuel from source 110 such that the gas is initially supplied to the compressor 50 at a higher pressure. For example, rather than regulating gas from source 110 from its stored pressure (e.g., 2000 psi) to a significantly lower compressor inlet pressure (e.g., stage 1 of compressor 50 at 100-300 psi), the gas may be uploaded to a higher pressure inlet of compressor 50 (e.g., stage 2 or stage 3 of compressor 50). This may result in more rapid uploading of fuel from source 110, less wear on compressor 50, and/or less energy waste. Similarly, in some embodiments high pressure gas being dispensed from source tank 20 to a receiving tank 200 may be fed into compressor 50 at a higher pressure inlet (e.g., bypassing stage 1 of compressor 50 to stage 2 or stage 3 of compressor 50) to provide more rapid and/or efficient fueling.

In an embodiment, the vehicle 10 may include supplemental storage for storing compressed natural gas in addition to, but not in place of, the onboard source tank 20. In one embodiment, the supplemental storage may be towed behind the vehicle on a trailer, for example. Unlike permanent natural gas stations and conventional fuel delivery vehicles, which may include standalone natural gas storage, vehicle 10 includes natural gas engine 30 operatively connected to source tank 20, as discussed above.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of delivering natural gas, comprising:
   delivering a source vehicle to a receiving tank for receiving natural gas at a remote refueling location, the source vehicle having a natural gas engine for driving the vehicle and a source tank disposed onboard the source vehicle for storing the natural gas; and
   transferring natural gas from the source vehicle to the receiving tank using pressure equalization between the source tank and the receiving tank and using a compressor disposed onboard the source vehicle,
   wherein the source tank comprises a composite material, is configured to store greater than about 200 DGE of natural gas at about 3600 psi and at about 70 degrees Fahrenheit, and is configured to supply natural gas to power the source vehicle engine.

2. The method of claim 1, wherein the onboard compressor is operatively connected to and powered by the source vehicle engine.

3. The method of claim 1, wherein the receiving tank is part of a customer vehicle.

4. The method of claim 1, wherein the source tank comprises a plurality of tanks for storing natural gas.

5. The method of claim 1, wherein the transferring natural gas from the source vehicle to the receiving tank uses tank equalization between the source tank and the receiving tank before using compression provided by the compressor disposed onboard the source vehicle.

6. The method of claim 1, wherein the transferring natural gas occurs at a rate of about 8 DGE/min to a pressure in the receiving tank of about 3600 psi.

7. The method of claim 1, wherein the transferring natural gas occurs at a rate of about 9 DGE/min to a pressure in the receiving tank of about 3600 psi.

8. The method of claim 1, wherein the transferring natural gas occurs at a rate of about 10 DGE/min to a pressure in the receiving tank of about 3600 psi.

9. The method of claim 1, wherein the transferring natural gas occurs at a rate of about 11 DGE/min to a pressure in the receiving tank of about 3600 psi.

10. The method of claim 1, wherein the source tank is adapted to configured to store greater than about 300 DGE of natural gas.

11. The method of claim 1, wherein the source tank is configured to store greater than about 600 DOE of natural gas.

12. The method of claim 1, wherein the source tank is configured to store about 700 DGE of natural gas.

13. The method of claim 1, wherein the source tank is configured to store about 1500 DOE of natural gas.

14. The method of claim 1, wherein the source tank comprises either a Type 3 NGV2 tank or a Type 4 NGV2 tank.

15. A natural gas fueling vehicle, comprising:
   a source tank disposed onboard the vehicle, comprising a composite material, configured to store greater than about 200 DGE of natural gas at about 3600 psi and at 70 degrees Fahrenheit, and configured to provide the natural gas to a discrete receiving tank;
   an engine operatively connected to the source tank for receiving natural gas from the source tank to power the engine; and
   a first compressor operatively connected to and powered by the natural gas engine for compressing natural gas delivered from the source tank to the discrete receiving tank.

16. The vehicle of claim 15, wherein the source tank comprises a plurality of tanks.

17. The vehicle of claim 15, further comprising a transfer case operatively connected between the natural gas engine and the first compressor for transferring power from the engine to the first compressor.

18. The vehicle of claim 15, wherein the receiving tank is part of a vehicle.

19. The vehicle of claim 15, further comprising a second compressor removably disposed on the vehicle, the second compressor to configured to be connected between the source tank and a natural gas source.

20. The vehicle of claim 15, further comprising a location monitoring device for monitoring the location of the source vehicle.

21. The vehicle of claim 20, wherein the location monitoring device comprises a GPS receiver.

22. The vehicle of claim 15, further comprising a fuel level sensor for monitoring the volume of natural gas in the source tank.

23. The vehicle of claim 15, further comprising a plurality of outlets for connecting to the discrete receiving tank, wherein each outlet is operatively connected to the source tank, and wherein the plurality of outlets are disposed at one or more of: the right front portion of the vehicle, the right rear portion of the vehicle, the left front portion of the vehicle, and the left rear portion of the vehicle.

24. The vehicle of claim 15, wherein the source tank is configured to store about 100 M BTUs of natural gas.

25. The vehicle of claim 15, wherein the source tank comprises either a Type 3 NGV2 tank or a Type 4 NGV2 tank.

26. The vehicle of claim 16, wherein the source tank is configured to store greater than about 600 DOE of natural gas.

* * * * *